US012718205B1

(12) United States Patent
Robicheaux et al.

(10) Patent No.: US 12,718,205 B1
(45) Date of Patent: Aug. 25, 2026

(54) COMPREHENSIVE SYSTEM FOR MANAGING INVENTORY, DELIVERY AND QUALITY CONTROL OF REUSABLE SETTING TOOLS

(71) Applicant: GRANT PRIDECO, INC., Houston, TX (US)

(72) Inventors: Michael R. Robicheaux, Breaux Bridge, LA (US); Trey Falgout, Lafayette, LA (US); M. Joseph Montgomery, Lafayette, LA (US); Brady Guilbeaux, Maurice, LA (US)

(73) Assignee: GRANT PRIDECO, INC., Houston, TX (US)

( * ) Notice: Subject to any disclaimer, the term of this patent is extended or adjusted under 35 U.S.C. 154(b) by 0 days.

(21) Appl. No.: 18/450,542

(22) Filed: Aug. 16, 2023

(51) Int. Cl.
*G06Q 10/30* (2023.01)
*G06Q 10/087* (2023.01)

(52) U.S. Cl.
CPC ........... *G06Q 10/30* (2013.01); *G06Q 10/087* (2013.01)

(58) Field of Classification Search
CPC ............................. G06Q 10/30; G06Q 10/087
See application file for complete search history.

(56) References Cited

U.S. PATENT DOCUMENTS 11,280,143 B2 * 3/2022 Robicheaux ........ E21B 23/0414
2005/0177467 A1 * 8/2005 Wang .................. G06Q 10/087 705/28
2006/0287873 A1 * 12/2006 Heard .................... G06Q 10/20 705/308
2007/0299747 A1 * 12/2007 Shorter ................ G06Q 10/087 700/106
2009/0018722 A1 * 1/2009 Fielding ............... G06Q 10/087 705/28
2012/0191496 A1 * 7/2012 Muench ................... G07C 5/00 705/7.11
2015/0363710 A1 * 12/2015 Meier .................... G06Q 10/06 235/376
2018/0165641 A1 * 6/2018 Liberman .......... G06Q 10/0875
2018/0225629 A1 * 8/2018 Brodersen ............ G06F 16/275

OTHER PUBLICATIONS

Arts, J. J. (2013). Spare parts planning and control for maintenance operations. [Phd Thesis 1 (Research TU/e /Graduation TU/e), Industrial Engineering and Innovation Sciences]. Technische Universiteit Eindhoven. https://doi.org/10.6100/IR760116 (Year: 2013).*

* cited by examiner

*Primary Examiner* — Florian M Zeender
*Assistant Examiner* — Kimberly S. Bursum
(74) *Attorney, Agent, or Firm* — CONLEY ROSE, P.C.

(57) ABSTRACT

A comprehensive system for managing inventory, delivery and quality control of reusable downhole setting tools. Component parts are laser engraved with scannable unique identification codes for part trackability and traceability purposes. Tools can be function-tested before being shipped to a well site or other remote location to confirm operational integrity. Tested tools arriving at a well site or other remote location can be scanned and used in wellbore operations. Previously used tools can be packaged at the well site or other remote location, scanned for trackability/traceability purposes, and returned to a shop or other facility for rebuilding and/or refurbishment. The rebuilt and/or refurbished tools can be tested for operational integrity. The process can be repeated.

17 Claims, 2 Drawing Sheets

Figure 1:
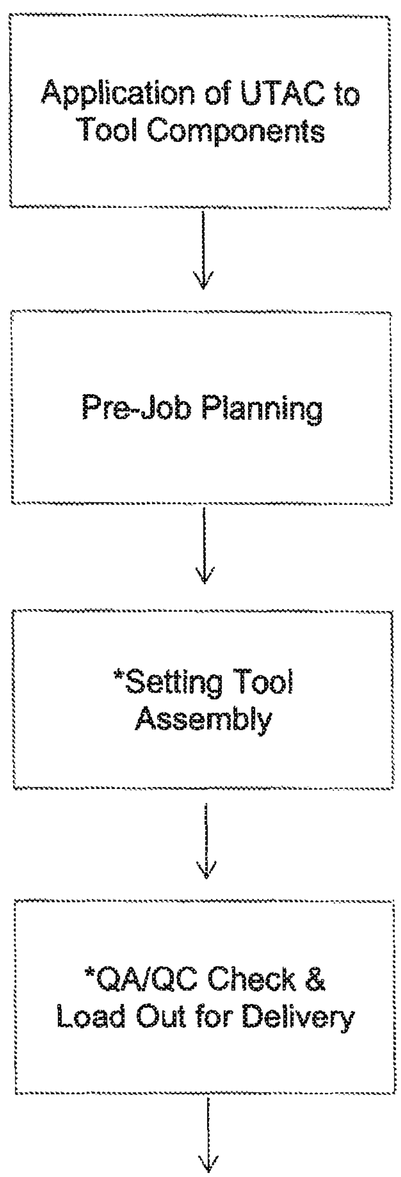
Figure 1:
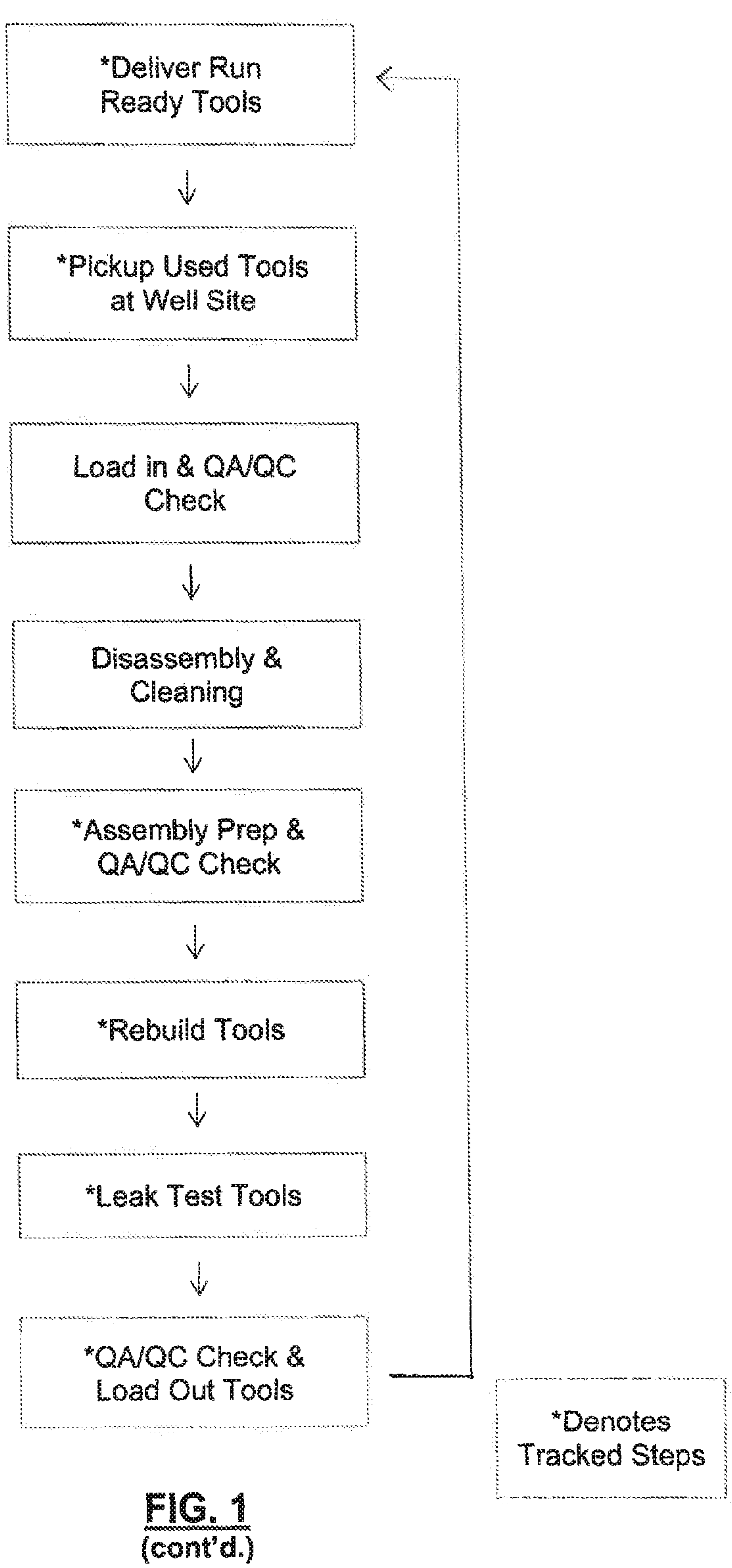

COMPREHENSIVE SYSTEM FOR MANAGING INVENTORY, DELIVERY AND QUALITY CONTROL OF REUSABLE SETTING TOOLS

BACKGROUND OF THE INVENTION

1. Field of the Invention

The present invention pertains to reusable setting tools that can be used to set plugs and other downhole equipment within wellbores. More particularly, the present invention pertains to a comprehensive system for managing the inventory, delivery and operational integrity of reusable downhole setting tools.

2. Brief Description of the Prior Art

Wells are typically drilled into the earth's crust using a drilling rig or other similar equipment. After a section of wellbore has been drilled to a desired depth, a string of pipe known as casing is typically conveyed into said well and cemented in place. The casing is often installed to provide structural integrity to the wellbore and to keep geologic formations isolated from one another.

In some applications, a wireline tool string may be run into the wellbore after the casing has been installed in a well. Although many different configurations are possible, the wireline tool string may include a downhole plug that may be set within the inner bore of the casing string at a desired location in the wellbore, as well as a setting tool for setting said downhole plug. Generally, such a plug is used to isolate one portion of a wellbore from another. Although this operation is commonly used in many different operations, such wellbore plugs are commonly used in connection with hydraulic fracturing operations.

Conventional downhole wireline setting tools are frequently "disposable"—that is, they are used only once, and thereafter they are retrieved from a well and subsequently discarded at the surface. As such, in order to avoid unnecessary waste, reduce costs and maximize efficiency, it is frequently advantageous to utilize reusable setting tools. Such reusable setting tools are generally run into a well, used to set a plug downhole within said well, retrieved from the well, recycled or redressed at the surface, and thereafter reused to set another plug in the manner described herein.

It is frequently difficult to keep track of setting tools and related components, verify that said setting tools and components are properly dressed/staged for operation, ensure that said components are properly delivered to and from remote work locations, rebuilt or redressed for reuse, and loaded out for the next job.

Thus, there is a need for an integrated and comprehensive system for managing the use and handling of setting tools and related inventory including, without limitation, some combination of the following: marking and tracking setting tools and related equipment, delivering said setting tools and related inventory between workshops or other facilities and remote well sites or other work locations, testing the operational integrity of reusable downhole setting tools prior to use and/or load out and efficiently recycling/redressing said setting tools for reuse.

SUMMARY OF THE INVENTION

In a preferred embodiment, the present invention comprises a comprehensive system for managing inventory, delivery and quality control of reusable downhole setting tools. Component parts of setting tools are individually marked with unique identification codes for tracking and supply chain purposes. Although other methods can be employed without departing from the scope of the present invention, said tools and related components can be laser engraved with unique identification codes. Alternatively, said setting tools and/or component parts thereof can be mechanically marked with unique identification codes such as, for example, using dot peen marking, etching and/or other mechanical marking systems. Said specific identifier can be associated with specific profile information for each tool/component such as, for example, part specifications, historical operational data (i.e., number, location and job parameters for previous runs), testing or quality control data, physical location and/or other relevant information.

Said unique identification codes and associated information can be maintained in a computer database, such as a cloud-based or other remotely accessible database. Further, such information can be beneficially read at desired times and/or locations. By way of illustration, but not limitation, such information can be read using at least one handheld optical sensor or other scanning device, thereby permitting quick and efficient multi-point tracking and traceability of all items marked with a unique identifier code. Notwithstanding the foregoing, it is to be understood that other systems can be used to read and store such information.

A setting tool and ancillary or associated components or equipment can be assembled at a warehouse or similar facility. Thereafter, the tools and components can be tested to verify operational integrity and confirm that all elements are in good condition and working order. Such test information can be stored in a database in association with corresponding unique identification codes. Additionally, said setting tool and equipment can be further checked for quality assurance purposes against a predetermined checklist.

A pre-job planning session can be beneficially held wherein job-specific issues can be fully considered and discussed. Tools can be delivered to a jobsite, such as a remote wellsite or location. Unique identification codes data for all tools can be tracked upon shipping, during transit and upon arrival at a customer location.

A predetermined number of set and loaded tools can be delivered for use, with direct communication with on-site personnel. While at the jobsite location, any previously used/expended tools (from prior jobs) can be scanned for unique identification codes and information uploaded/saved for tracking purposes. Used setting tools and related equipment can be packaged for return delivery back to a workshop, warehouse or other central facility, where unique identification codes can again be scanned for tracking purposes.

Setting tools can be disassembled or otherwise broken down for maintenance and/or repair or refurbishment/redress for subsequent reuse. Components can be cleaned and repaired, including pursuant to a predetermined and detailed procedure or checklist. New replacement parts can include unique identification codes for quick and efficient scanning of parts/components for tracking and traceability purposes. Refurbished and/or redressed tools can be beneficially inspected and tested to confirm operational integrity prior to running said tools in a well, while tools failing said testing can be set aside for further repair.

Tools can be packaged for delivery to a remote work location, such as a wellsite. Upon arrival at said remote location, unique identification code information can be scanned for tracking and traceability purposes. Tools can again be tested to confirm operational integrity and to verify that no unintended damage occurred during transportation or handling prior to actual use in a well. Operations can be performed in a well using the tools, the tools can be retrieved from said well, and the process can be repeated.

Unique identification code data for all tools can be tracked upon shipping, during transit and/or upon arrival at a customer location. Such information can be stored in a computer database (including, without limitation, a cloud-based computer database). Additionally, other job parameters and job/tool performance information can also be stored in said computer database and linked to tracking and traceability information such as, for example, unique identification code data. Over time, this information can be used to identify trends for certain users, job variables and/or locations; such information can be beneficially utilized to optimize job design and for troubleshooting purposes.

BRIEF DESCRIPTION OF DRAWINGS/FIGURES

The foregoing summary, as well as any detailed description of the preferred embodiments, is better understood when read in conjunction with the drawings and FIGURES contained herein. For the purpose of illustrating the invention, the drawings and FIGURES show certain preferred embodiments. It is understood, however, that the invention is not limited to the specific methods and devices disclosed in such drawings or FIGURES.

Further, the drawings constitute a part of this specification and include exemplary embodiments of the technology. It is to be understood that in some instances, various aspects of the invention may be shown exaggerated or enlarged to facilitate an understanding of the invention. Therefore, the drawings may not be to scale.

FIG. 1 depicts a schematic view of the setting tool management system of the present invention.

DETAILED DESCRIPTION OF A PREFERRED EMBODIMENT

Before describing various embodiments of the present disclosure in further detail by way of exemplary description, examples, and results, it is to be understood that the apparatus and methods of the present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning, and the embodiments and examples are meant to be exemplary, not exhaustive. Also, it is to be understood that the phraseology and terminology employed herein is for the purpose of description only and should not be regarded as limiting unless otherwise indicated as so. Moreover, in the following detailed description, numerous specific details are set forth in order to provide a more thorough understanding of the present disclosure.

It will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications, and equivalents apparent to those having ordinary skill in the art are included within the scope of the present disclosure. Thus, while the apparatus and methods of the present disclosure have been described in terms of particular embodiments, it will be apparent to those of skill in the art that variations may be applied to the apparatus and methods and the steps or in the sequence of steps of the methods described herein without departing from the concept, spirit, and scope of the inventive concepts.

FIG. 1 depicts a schematic view of the setting tool management system of the present invention. In a preferred embodiment, the present invention comprises a process of marking individual setting tools, related components and equipment for tracking and supply chain purposes. In a preferred embodiment, said tools and related components and equipment are mechanically marked with a unique marking referred to herein as an Universal Asset Tracking Code ("UTAC"); by way of example, but not limitation, said tools and related components and equipment can be laser engraved, dot peen marked and/or etched. Said UTAC can be associated with specific profile information for each tool/component; by way of illustration, but not limitation, such information can include part specifications, historical operational data (i.e., number, location and job parameters for previous runs), testing or quality control data, physical location and/or other relevant information.

The UTAC and associated information can be maintained in a computer database, such as a cloud-based or other remotely accessible database. Said UTAC's can be beneficially read; in a preferred embodiment, said UTAC's can be scanned using a handheld optical sensor or other scanning device, thereby permitting quick and efficient multi-point tracking and traceability of all items marked with a unique UTAC identifier including, without limitation, at remote work locations, during storage, before or after use in a well, or during transit to or from a facility or warehouse.

It should be noted that there are many different types and designs of setting tools and related components. By way of illustration, but not limitation, the present invention can be used in connection with the setting tool disclosed in U.S. Pat. No. 11,674,361 B1, dated Jun. 13, 2023, which is incorporated herein by reference for all purposes. Similarly, by way of illustration, but not limitation, testing of operational integrity of setting tools can be performed using the testing assembly disclosed in U.S. Pat. No. 11,708,757 B1, dated Jul. 25, 2023, which is incorporated by reference herein for all purposes. It is to be understood that the system of the present invention can also be used with other setting tools and testing methods or equipment without departing from the scope of the present invention.

Initially a setting tool and ancillary or associated components or equipment can be assembled at a warehouse or similar facility; for purposes hereof, such items are collectively referred to herein as "tools", but it is to be understood that such term should be interpreted to include many different devices and related components or equipment. Thereafter, said items can be tested to verify operational integrity and confirm that all elements are in good condition and working order. Such information can be stored in a database in association with corresponding UTAC data. Additionally, said setting tool and ancillary or associated components or equipment can be further tested and/or checked for quality assurance purposes against a predetermined checklist.

A pre-job planning session can be beneficially held, with multiple interested parties also participating remotely via videoconference. During this session, matters can be fully considered and discussed such as job run rate and/or other job parameters, logistics planning, resource and tool allocation, tool delivery and on-site training/onboarding planning. Tools can be checked for operational and functional integrity and loaded for shipment.

Tools can be delivered to a jobsite, such as a remote wellsite or location. UTAC data for all tools can be tracked upon shipping, during transit and upon arrival at a customer location. Upon arrival at a jobsite location, a predetermined number of set and loaded tools can be delivered for use, with direct communication with on-site personnel.

While at the jobsite location, any previously used/expended tools can be scanned for UTAC information and said information can be used for tracking purposes. Said previously used tools can be quality checked, and packaged for return delivery back to a workshop, warehouse or other central facility. Such used/expending tools can transported back to said workshop, warehouse or other central facility, scanned for UTAC tracking and record keeping purposes.

Thereafter, all such tools can be disassembled or otherwise broken down for maintenance (including, without limitation, repair or refurbishment/redress for subsequent reuse). Each component can be carefully inspected and, thereafter, washed and, if needed, repaired. In the case of setting tools, such refurbishment/redress can include, but is not necessarily limited to, installing new O-rings, grease cups, dampening assembly components and/or other parts. Such refurbishment/redress can be done pursuant to a predetermined and detailed procedure or checklist. New replacement parts can have UTAC identifiers for quick and efficient scanning of parts/components for tracking and traceability purposes. Refurbished and/or redressed tools can be beneficially inspected and tested to confirm operational and functional integrity of said tools can be performed on location prior to running said tools in a well. Any tools failing said testing can be set aside for further repair.

Tools can be packaged for delivery to a remote work location, such as a wellsite. Upon arrival, tool UTAC information can be scanned for tracking and traceability purposes. If desired, said tools can again be tested to confirm operational integrity and verify that no unintended damage occurred during transportation or handling prior to actual use in a well. Operations can be performed in a well using the tools, the tools can be retrieved from said well, and the process can be repeated.

UTAC information for all tools can be tracked upon shipping, during transit and/or upon arrival at a customer location. Such information can be stored in a computer database (including, without limitation, cloud-based computer database(s)). Additionally, other job parameters and job/tool performance information can also be stored in said computer database(s) and linked to tracking and traceability information such as, for example, unique identification code data. Over time, this information can be used to identify trends for particular users, job variables and/or locations; such information can be beneficially utilized in order to optimize job design and for troubleshooting purposes.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the term "step" might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided. One skilled in the relevant art will recognize, however, that the present invention may be practiced without one or more of the specific details, or with other methods, components, materials, and so forth. In other instances, well-known structures, materials, or operations are not shown or described in detail to avoid obscuring aspects of the invention.

What is claimed:

1. A method for managing inventory, delivery and quality control of reusable downhole setting tools comprising:

testing a first reusable downhole setting tool for operational integrity at a shop or other facility, wherein a first component of said first reusable downhole setting tool is marked with a first unique asset tracking code;

based on the first unique asset tracking code and testing the first reusable downhole setting tool, updating a computer database that includes a first specification for said first component of said first reusable downhole setting tool, first historical operational data for said first component of said first reusable downhole setting tool, and first quality control data for said first component of said first reusable downhole setting tool;

delivering said first reusable downhole setting tool to a well site;

running said first reusable downhole setting tool in a wellbore at said well;

testing a second reusable downhole setting tool for operational integrity at said shop or other facility;

delivering said second reusable downhole setting tool to said well site;

collecting said first reusable downhole setting tool from said well site, wherein said first reusable downhole setting tool has been previously run in a well at said well site;

returning said first reusable downhole setting tool from said well site to said shop or other facility;

redressing said first reusable downhole setting tool at said shop or other facility by replacing a second component of said first reusable downhole setting tool with a replacement second component that is marked with a second unique asset tracking code;

based on the second unique asset tracking code and redressing the first reusable downhole setting tool, updating said computer database that further includes a second specification for said replacement second component of said first reusable downhole setting tool, second historical operational data for said replacement second component of said first reusable downhole setting tool, and second quality control data for said replacement second component of said first reusable downhole setting tool; and delivering, to a well site for reuse, said redressed and tested first reusable downhole setting tool that includes said first component that is marked with said first unique asset tracking code and that includes said replacement second component that is marked with said second unique asset tracking code.

2. The method of claim 1, further comprising:

running said second downhole setting tool into a wellbore at said well site, wherein a third component of said second reusable downhole setting tool is marked with a third unique asset tracking code;

based on the third unique asset tracking code, updating said computer database to include performance information for said third component of said second reusable downhole setting tool, wherein said performance information is based on running said second reusable downhole setting tool in said wellbore at said well site;

collecting said second downhole setting tool from said well site after said second downhole setting tool has been run in a well at said well site;

returning said second downhole setting tool from said well site to said shop or other facility;

redressing said second downhole setting tool at said shop or other facility by replacing a fourth component of said second reusable downhole setting tool with a replacement fourth component that is marked with a fourth unique asset tracking code;

based on the fourth unique asset tracking code and redressing the second reusable downhole setting tool, updating said computer database that further includes a third specification for said replacement fourth component of said second reusable downhole setting tool, third historical operational data for said replacement fourth component of said second reusable downhole setting tool, and third quality control data for said replacement fourth component of said second reusable downhole setting tool; and delivering, to said well site, said redressed and tested second downhole setting tool that includes said third component that is marked with said third unique asset tracking code and that includes said replacement fourth component that is marked with said fourth unique asset tracking code.

3. The method of claim 1, further comprising:

mechanically marking said first component of said first downhole setting tool with said first unique asset tracking code, wherein said first unique asset tracking code can be selectively read;

mechanically marking said replacement third component of said first downhole setting tool with said third unique asset tracking code, wherein said third unique asset tracking code can be selectively read; and mechanically marking said second component of said second down hole setting tool with a second unique asset tracking code, wherein said second unique asset tracking code can be selectively read.

4. The method of claim 3, wherein said first, second, and third unique asset tracking codes are laser engraved, dot peen marked or etched.

5. The method of claim 3, wherein first asset tracking code, second asset tracking code, and third asset tracking code information is uploaded to said computer database.

6. The method of claim 5, wherein additional information regarding said first reusable downhole setting tool or second reusable downhole setting tool can be selectively uploaded to said computer database and linked to a unique asset tracking code.

7. A method for recycling downhole setting tools comprising:

testing a first reusable downhole setting tool for operational integrity at a shop or other facility, wherein a first component of said first reusable downhole setting tool is marked with a first unique asset tracking code;

based on the first unique asset tracking code and testing the first reusable downhole setting tool, updating a computer database that includes a first specification for said first component of said first reusable downhole setting tool, first historical operational data for said first component of said first reusable downhole setting tool, and first quality control data for said first component of said first reusable downhole setting tool;

delivering said first reusable downhole setting tool to a well site;

running said first reusable downhole setting tool in a wellbore at said well site;

testing a second reusable downhole setting tool for operational integrity at a shop or other facility, wherein a second component of said second reusable downhole setting tool is marked with a second unique asset tracking code;

based on the second unique asset tracking code and testing the second reusable downhole setting tool, updating said computer database that further includes a second specification for said second component of said second reusable downhole setting tool, second historical operational data for said second component of said second reusable downhole setting tool, and second quality control data for said second component of said second reusable downhole setting tool;

delivering said second reusable downhole setting tool to said well site;

collecting said first reusable downhole setting tool from said well site, wherein said first reusable downhole setting tool has been previously run in a well at said well site;

running said second reusable downhole setting tool in a wellbore at said well site;

based on the second unique asset tracking code, updating said computer database to include performance information for said second component of said second reusable downhole setting tool, wherein said performance information is based on running said second reusable downhole setting tool in said wellbore at said well site;

returning said first reusable downhole setting tool from said well site to said shop or other facility;

redressing said first reusable downhole setting tool at said shop or other facility by replacing a third component of said first reusable downhole setting tool with a replacement third component that is marked with a third unique asset tracking code;

based on the third unique asset tracking code and redressing the first reusable downhole setting tool, updating said computer database that further includes a third specification for said replacement third component of said first reusable downhole setting tool, third historical operational data for said replacement third component of said first reusable downhole setting tool, and third quality control data for said replacement third component of said first reusable downhole setting tool;

delivering, to said well site, said redressed and tested first reusable downhole setting tool that includes said first component that is marked with said first unique asset tracking code and that includes said replacement third component that is marked with said third unique asset tracking code;

collecting said second reusable downhole setting tool from said well site, wherein said second reusable downhole setting tool has been previously run in a well at said well site; and returning said second reusable downhole setting tool from said well site to said shop or other facility.

8. The method of claim 7, wherein said first unique asset tracking code, said second unique asset tracking code, and said third unique asset tracking code are configured to be selectively read and uploaded to said computer database.

9. The method of claim 7, wherein said first unique asset tracking code is laser engraved, dot peen marked or etched on said first component of said first reusable downhole setting tool, wherein said second unique asset tracking code is laser engraved, dot peen marked or etched on said second component of said second reusable downhole setting tool, and wherein said third unique asset tracking code is laser engraved, dot peen marked or etched on said replacement third component of said first reusable downhole setting tool.

10. The method of claim 8, wherein said first unique asset tracking code is read at said facility after said first reusable downhole setting tool is tested, and said read information is uploaded to said computer database.

11. The method of claim 8, wherein said first unique asset tracking code is read after said first reusable downhole setting tool is delivered to said well site, and said read information is uploaded to said computer database.

12. The method of claim 8, wherein said first unique asset tracking code is read after said first reusable downhole setting tool is collected at said well site, and said read information is uploaded to said computer database.

13. The method of claim 8, wherein said second unique asset tracking code is read after said second reusable downhole setting tool is returned from said well site to said shop or other facility, and said read information is uploaded to said computer database.

14. The method of claim 8, wherein said first unique asset tracking code and said third unique asset tracking code are read after said first reusable downhole setting tool is redressed at said shop or other facility, and said read information is uploaded to said computer database.

15. The method of claim 8, wherein said second unique asset tracking code is read after said second reusable downhole setting tool is tested for operational integrity at said shop or other facility, and said read information is uploaded to said computer database.

16. The method of claim 1, wherein the first unique asset tracking code and the second unique asset tracking code are different asset tracking codes.

17. The method of claim 7, further comprising:

redressing said second reusable downhole setting tool at said shop or other facility by replacing said second component of said second reusable downhole setting tool with a replacement second component that is marked with a fourth unique asset tracking code; and delivering, to said well site, said redressed second reusable downhole setting tool that includes said replacement second component that is marked with said fourth unique asset tracking code.

* * * * *